(12) United States Patent
Kempinski

(10) Patent No.: US 10,030,584 B2
(45) Date of Patent: Jul. 24, 2018

(54) SOLID STATE SPARK DEVICE AND EXCITER CIRCUIT USING SUCH A DEVICE

(71) Applicant: Champion Aerospace LLC, Liberty, SC (US)

(72) Inventor: Steve J. Kempinski, Seneca, SC (US)

(73) Assignee: Champion Aerospace LLC, Liberty, SC (US)

( * ) Notice: Subject to any disclaimer, the term of this patent is extended or adjusted under 35 U.S.C. 154(b) by 0 days.

(21) Appl. No.: 15/410,901

(22) Filed: Jan. 20, 2017

(65) Prior Publication Data

US 2017/0211482 A1    Jul. 27, 2017

Related U.S. Application Data

(60) Provisional application No. 62/281,494, filed on Jan. 21, 2016.

(51) Int. Cl.
*F02C 7/266* (2006.01)
*F02P 3/08* (2006.01)
*F02P 15/00* (2006.01)

(52) U.S. Cl.
CPC ............ *F02C 7/266* (2013.01); *F02P 3/0807* (2013.01); *F02P 15/003* (2013.01); *F05D 2220/323* (2013.01); *F05D 2270/52* (2013.01)

(58) Field of Classification Search
None
See application file for complete search history.

(56) References Cited

U.S. PATENT DOCUMENTS

2002/0101188 A1*  8/2002  Frus .................. F02P 3/0869
                                                   315/224

* cited by examiner

*Primary Examiner* — Jany Richardson
(74) *Attorney, Agent, or Firm* — Reising Ethington P.C.

(57) ABSTRACT

A solid state spark device that operates as a two terminal spark gap in a CDI exciter of an aircraft ignition system. The device includes a triggering transformer, a triggering circuit, and a control circuit. The triggering circuit is electrically connected to a first coil of the transformer and includes circuit elements connected to supply current to the first coil upon charging of the triggering circuit up to a triggering voltage. This current through the first coil of the triggering transformer induces an output in a second coil of the transformer. The control circuit is electrically connected to the second coil and includes a switch controlled by the output from the second coil. The switch, when activated by the triggering circuit, discharges energy from the exciter into an igniter of the aircraft ignition system.

10 Claims, 1 Drawing Sheet

SOLID STATE SPARK DEVICE AND EXCITER CIRCUIT USING SUCH A DEVICE

TECHNICAL FIELD

This invention generally relates to turbine engine ignition systems and, more specifically, to capacitive discharge ignition (CDI) exciters used in aircraft jet engines.

BACKGROUND

Aircraft are frequently powered by turbine engines. Turbine engines (also referred to as gas turbines) are a type of internal combustion engine that have an upstream rotating compressor coupled with a downstream turbine and a combustion chamber in-between where fuel is injected and combusted to create pressurized exhaust having a high velocity. As air enters the turbine engine, fuel is added and ignited using a suitable ignition system, such as a capacitive discharge ignition (CDI) system. The capacitive discharge system includes an exciter that generates a spark discharge at an igniter in the combustion chamber to ignite the fuel. Typically, the exciter portion of the capacitive discharge ignition system creates this spark discharge using a spark-gap gas-discharge tube (SGT). The SGT includes two electrodes that are spaced apart by an air or spark gap in the presence of an inert gas. The SGT is electrically connected between an igniter and a storage capacitor receiving a charge from a power source. When the voltage of the storage capacitor exceeds the trigger voltage of the SGT, the SGT starts to conduct thus delivering the stored energy from the capacitor ultimately causing the igniter to spark.

In a typical SGT construction, both of the electrodes of the SGT are enclosed and sealed from the atmosphere within a glass housing, which also includes a gas that facilitates a stable voltage level to release energy thereby creating a spark at the igniter. Many SGTs use a radioactive inert gas to maintain ionization within the SGT. The use of a glass SGT with radioactive gas fill may present risks due to glass component breakage and gas leakage, thereby affecting the CDI system operation.

Accordingly, it would be desirable to provide an alternative component that provides the functionality of a SGT without the associated risks of breakage and leakage. Further, it would be desirable to provide an alternative component that provides consistent sparking voltages supplied to the igniter.

SUMMARY

In accordance with an aspect of the invention, there is provided a solid state spark device for use in an aircraft ignition system. The device includes a triggering transformer, a triggering circuit, and a control circuit. The triggering circuit is electrically connected to a first coil of the transformer and includes circuit elements connected to supply current to the first coil upon charging of the triggering circuit up to a triggering voltage. This current through the first coil of the triggering transformer induces an output in a second coil of the transformer. The control circuit is electrically connected to the second coil and includes a switch controlled by the output from the second coil.

For at least some embodiments, this construction allows the solid state spark device to be placed in circuit in an exciter for an ignition system of a turbine engine so as to supply sparking power from a storage capacitor or other capacitive storage element to an igniter. The device may be placed in series between the storage capacitor and igniter such that it can be implemented as a two terminal device that operates from charging current received from the storage capacitor as the capacitor charges up to a desired sparking voltage for the igniter.

In accordance with various different embodiments, the solid state spark device may include any one or more of the following features in any technically-feasible combination.

- The device is a two terminal device connectable in series between the igniter and storage capacitor.
- The circuit elements of the device are configured so that the triggering circuit charges up to the triggering voltage when the storage capacitor is charged to the sparking voltage, and wherein the sparking voltage is in a range of 3,000-4,200 volts, preferably about 4,000 volts.
- One of the circuit elements of the triggering circuit is a diode for alternating current (DIAC). This DIAC may have a breakdown voltage equal to or below the triggering voltage such that when the triggering circuit charges to the triggering voltage, the DIAC switches on and supplies the current to the first coil of the triggering transformer.
- The circuit elements of the triggering circuit includes a capacitor and a plurality of resistive elements wired to charge the capacitor to the triggering voltage.
- The switch is a silicon-controlled rectifier (SCR) having a gate connected to receive the output from the second coil.
- The circuit elements prevent the supply of current to the first coil until the received voltage from the storage capacitor reaches the sparking voltage.
- The circuit elements include a capacitor charged via an input of the triggering circuit, wherein the triggering circuit is configured to discharge the capacitor via the first coil when the voltage on the capacitor reaches the triggering voltage.
- Where the triggering circuit includes the capacitor, the circuit may include a switch that is electrically connected between the capacitor and first coil, wherein upon charging of the capacitor to the triggering voltage, the switch of the triggering circuit discharges the capacitor via the first coil. Also, the triggering circuit may include a voltage divider connected between the input of the triggering circuit and the capacitor.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE ILLUSTRATED EMBODIMENT

Figure 1:
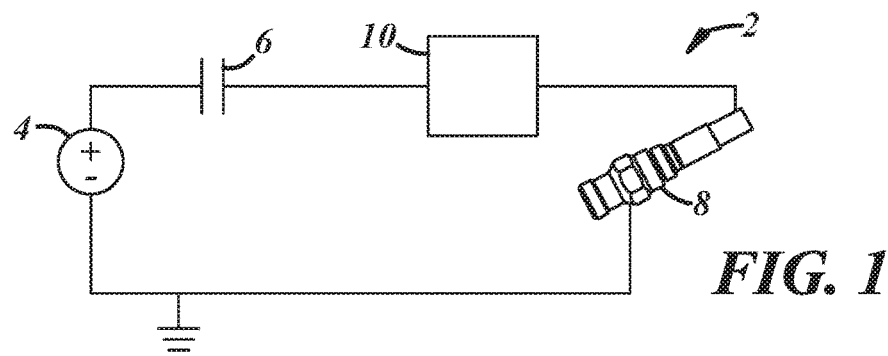
FIG. 1 is a block diagram of an exemplary embodiment of a turbine engine ignition system.

FIG. 1 depicts a generalized block diagram showing an exemplary implementation of a turbine engine ignition system 2 that includes a solid state device that provides sparking energy for an igniter without the need for spark-gap gas-discharge tube (SGT). The system 2 includes a power source 4, a capacitive storage element 6, an igniter 8, and a solid state spark device 10. Generally speaking, the power source 4 can apply a charge to the capacitive storage element which, as shown, may be a capacitor 6. When the capacitor 6 accumulates sufficient charge it causes the igniter 8 to discharge, thereby creating a combustion-initiating spark. The capacitor 6 and solid state spark device 10 together form an exciter with the spark device 10 operating as a switch regulating the discharge of the capacitor 6 across the igniter 8 in order to permit discharge only when sufficient energy exists in capacitor 6, thereby ensuring a sufficiently powerful spark.

Figure 2:
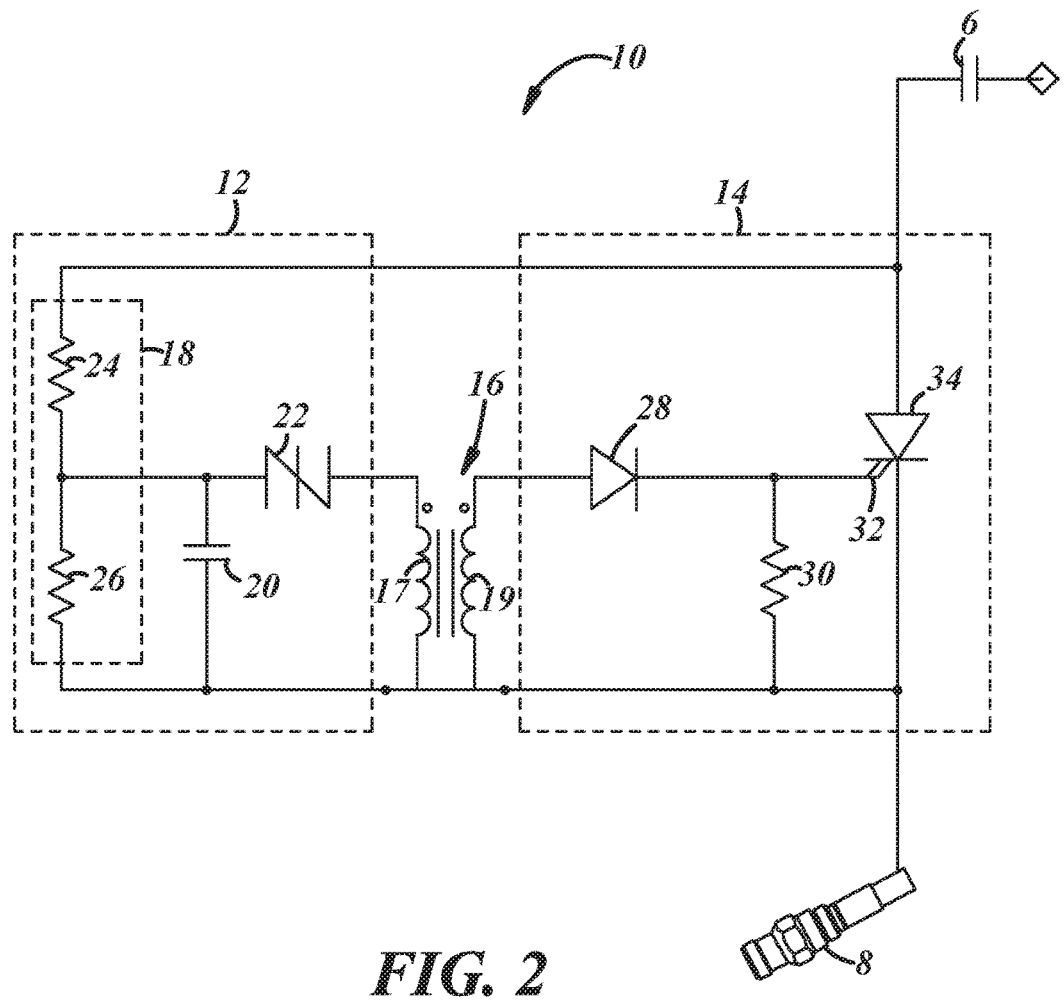
FIG. 2 is a schematic diagram of an exciter which forms a part of the turbine engine ignition system of FIG. 1.

With reference to FIG. 2, there is shown a schematic of an exemplary solid state spark device 10 that is used with the turbine engine ignition system 2. The spark device 10 includes a triggering circuit 12, a control circuit 14, and a triggering transformer 16. The spark device 10 can be electrically connected to the capacitor 6 that ultimately provides voltage/current to the igniter 8 causing spark. The triggering circuit 12 of system 10 can be electrically connected to the input from capacitor 6 as well as a primary coil 17 of the triggering transformer 16. The triggering circuit 12 includes a number of circuit elements to carry out its functions; these include a voltage divider 18, a capacitor 20, and a switch 22. Both the voltage divider 18 and the capacitor 20 are electrically connected to the switch 22. In this implementation, the switch 22 can be implemented using a diode for alternating current (DIAC); however, other types of switches could be substituted.

The voltage divider 18 can comprise two resistors 24 and 26; the resistor 26 can be wired in parallel with the capacitor 20. Resistor 24 can have a resistance value large enough to withstand the voltage amounts applied across it and reduce leakage current across the capacitor 6. The switch 22 and resistors 24 and 26 of the triggering circuit 12 can be selected such that the output voltage from the triggering circuit 12 at the primary coil 17 is zero until the capacitor 6 is charged to a sparking voltage sufficient to provide the desired spark energy at igniter 8. Once the capacitor 6 reaches the sparking voltage (e.g., 3,000 volts), the triggering circuit 12 will then output current to the primary coil 17 causing the spark device 10 to discharge the stored energy on capacitor 6 into igniter 8, as will be described below.

The values of resistors 24 and 26 can be selected based on the desired sparking voltage for capacitor 6 and on the breakdown voltage of the DIAC switch 22. Thus, the resistors 24, 26 of voltage divider 18 have resistance values that allow capacitor 20 to charge up to a triggering voltage dependent on or equal to the breakdown voltage of the switch 22 when the capacitive storage element 6 reaches the sparking voltage. The quantity and resistance value of the resistors used in the triggering circuit 12 can depend on desired sparking voltage being delivered to the igniter 8. In one embodiment, the sparking voltage can be 3,000 volts (V) with the sparking device configured to discharge capacitor 6 into igniter 8 once the capacitor 6 reaches that sparking voltage. In this embodiment, the switch 22 may be a DIAC having a breakdown voltage of about 260 volts, which is the point at which the switch becomes conductive, thereby supplying current to the coil 17 and thereby energizing transformer 16. To achieve triggering at this voltage, the resistors 24 and 26 can be implemented using a 30 MΩ resistor and a 284 KΩ resistor, respectively.

In other embodiments, different sparking voltages for capacitor 6 and triggering voltages for switch 22 may be used; for example, the sparking voltage may be 4,000 volts or may range up to, for example, 4,200 volts (V); and the triggering circuit 12 may be implemented with different resistance values or numbers of resistors as desired or necessary to achieve the desired voltage trigger point.

As a voltage level at the capacitive storage element 6 increases or ramps up, the voltage at the voltage divider 18 and capacitor 20 can increase at the same or similar rate. Once the voltage across the capacitor 20 reaches the triggering voltage, the breakdown voltage of the switch 22 has been met and current flows from capacitor 20 through the primary coil 17. This current from the switch 22 flows through the primary coil 17 and induces current flow in a secondary coil 19 of the triggering transformer 16 through a steering diode 28 of the control circuit 14.

The control circuit 14 can be electrically connected to the secondary coil 19 of the triggering transformer 16 and includes the steering diode 28 and a resistor 30 that provide electrical input to a gate 32 of switch 34. The induced current flow in the secondary coil 19 can pass through the steering diode 28 to the gate 32. The current from the secondary coil 19 reaching the gate 32 closes the switch 34 thereby making it conductive. As a result, charge from the capacitor 6 can pass through the switch 34 to the igniter 8 thereby creating a spark. When the current induced in the secondary coil 19 decays, the current to the gate 32 stops and the switch 34 opens after the energy of the capacitor has been exhausted. This process can be repeated for subsequent sparks by subsequent charging of the capacitor 6, and the spark rate may be controlled based in part on the resistance values for resistors 24 and 26, as well as using other techniques that will be known or will be apparent to those skilled in the art.

The switch 34 can be implemented using a thyristor or silicon-controlled rectifier (SCR), such as a MOS-controlled semi-conductor switch. In one particular implementation, the switch 34 used in the solid state spark device 10 can be the switch assembly described in U.S. Pat. No. 7,880,281, the entire contents of which are hereby incorporated by reference. The resistor 30 may be used to provide a low impedance at the gate 32 of switch 34 making it less susceptible to electromagnetic interference (EMI) or other switching noise.

It is to be understood that the foregoing description is not a description of the invention itself, but of one or more preferred exemplary embodiments of the invention. The invention is not limited to the particular embodiment(s) disclosed herein, but rather is defined solely by the claims below. It should be appreciated that the resistors and switches identified above can be generically be identified by the term "circuit element," which includes resistors or switches. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A solid state spark device for use in an aircraft ignition system, comprising:
   a triggering transformer having first and second coils;
   a triggering circuit electrically connected to the first coil, the triggering circuit including circuit elements connected to supply current to the first coil upon charging of the triggering circuit to a triggering voltage, wherein the current through the first coil of the triggering transformer induces an output in the second coil; and
   a control circuit that is electrically connected to the second coil and includes a switch controlled by the output from the second coil;
   wherein the device is a two terminal device connectable in series between an igniter and a capacitive storage element that charges up to a sparking voltage sufficient to create a spark on the igniter.

2. The solid state spark device of claim 1, wherein the sparking voltage is in a range of 3,000 volts to 4,200 volts and wherein the circuit elements are configured so that the triggering circuit charges to the triggering voltage when the capacitive storage element is charged to the sparking voltage.

3. The solid state spark device of claim 2, wherein the sparking voltage is 4,000 volts.

4. The solid state spark device of claim 1, wherein one of the circuit elements of the triggering circuit is a diode for alternating current (DIAC).

5. The solid state spark device of claim 1, wherein the circuit elements of the triggering circuit include a capacitor and a plurality of resistive elements wired to charge the capacitor to the triggering voltage.

6. The solid state spark device of claim 1, wherein the switch is a silicon-controlled rectifier (SCR) having a gate connected to receive the output from the second coil.

7. The solid state spark device of claim 1, wherein the circuit elements prevent the supply of current to the first coil until the received voltage from the capacitive storage element reaches the sparking voltage.

8. The solid state spark device of claim 1, wherein the circuit elements include a capacitor charged via an input of the triggering circuit, wherein the triggering circuit is configured to discharge the capacitor via the first coil when the voltage on the capacitor reaches the triggering voltage.

9. A solid state spark device for use in an aircraft ignition system, comprising:
   a triggering transformer having first and second coils;
   a triggering circuit electrically connected to the first coil, the triggering circuit including circuit elements connected to supply current to the first coil upon charging of the triggering circuit to a triggering voltage, wherein the current through the first coil of the triggering transformer induces an output in the second coil; and
   a control circuit that is electrically connected to the second coil and includes a switch controlled by the output from the second coil;
   wherein the circuit elements include a capacitor charged via an input of the triggering circuit, wherein the triggering circuit is configured to discharge the capacitor via the first coil when the voltage on the capacitor reaches the triggering voltage, wherein the circuit elements of the triggering circuit include a switch electrically connected between the capacitor and first coil, and wherein upon charging of the capacitor to the triggering voltage, the switch of the triggering circuit discharges the capacitor via the first coil.

10. The solid state spark device of claim 9, wherein the triggering circuit includes a voltage divider connected between the input of the triggering circuit and the capacitor.

* * * * *